July 25, 1961    J. T. TIMMS    2,993,339
ROTARY, HYDRAULIC PUMP AND MOTOR TRANSMISSION
Filed March 3, 1959    4 Sheets-Sheet 1
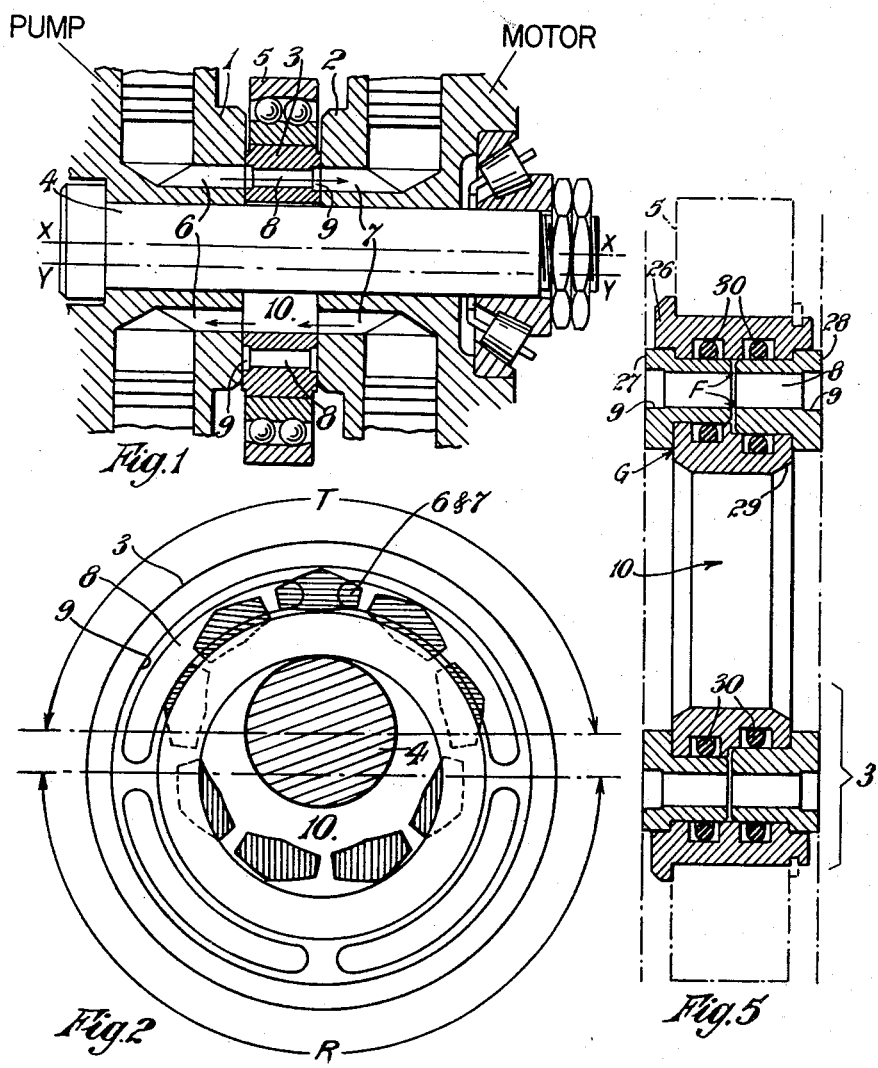
INVENTOR
JACK THOMAS TIMMS
BY Lawson and Taylor July 25, 1961  J. T. TIMMS  2,993,339
ROTARY, HYDRAULIC PUMP AND MOTOR TRANSMISSION
Filed March 3, 1959  4 Sheets-Sheet 2

INVENTOR
JACK THOMAS TIMMS
BY Lawson and Taylor

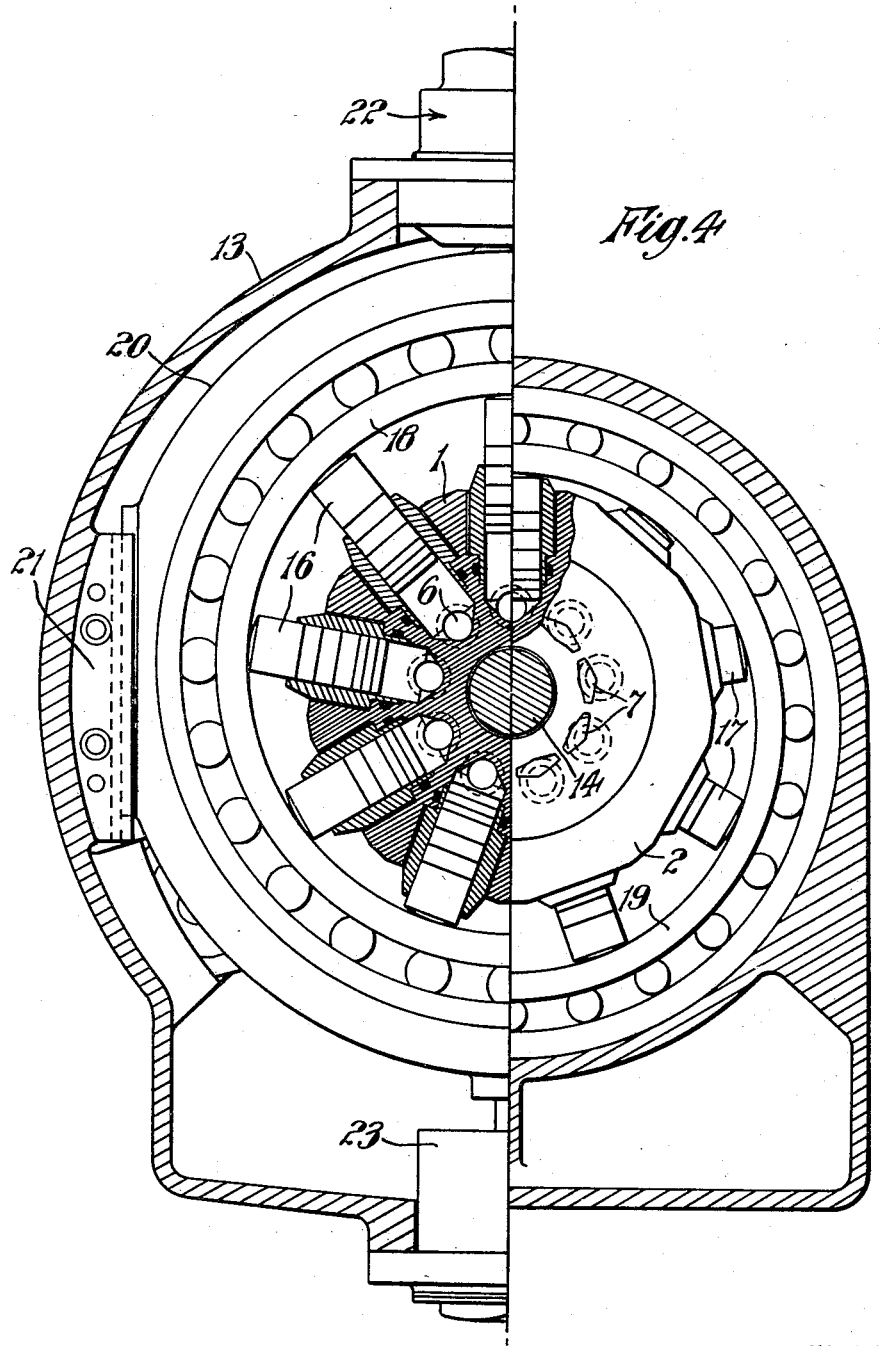

July 25, 1961 J. T. TIMMS 2,993,339
ROTARY, HYDRAULIC PUMP AND MOTOR TRANSMISSION
Filed March 3, 1959 4 Sheets-Sheet 4

INVENTOR
JACK THOMAS TIMMS
BY

United States Patent Office
2,993,339
Patented July 25, 1961

2,993,339
ROTARY, HYDRAULIC PUMP AND MOTOR TRANSMISSION
Jack T. Timms, Newcastle-upon-Tyne, England, assignor to George Angus & Company Limited, Newcastle-upon-Tyne, England
Filed Mar. 3, 1959, Ser. No. 796,921
Claims priority, application Great Britain Mar. 11, 1958
5 Claims. (Cl. 60—53)

This invention relates to hydraulic apparatus for transmitting continuous rotary motion, of the kind comprising a pump and motor combination.

There is scope for improvement in the power transmission efficiency of hydraulic apparatus of the pump and motor kind. A considerable proportion of power loss is due to pipe friction in the liquid passages between the pump and the motor and to mechanical loss and leakage in the valving arrangements which regulate liquid flow through such passages, involving, for example, rotation of a cylinder block face against a stationary valve plate.

I have previously made an improved hydraulic transmission, described in United States patent specification No. 2,812,638, in which rotary pump and motor bodies have port members directly opposed in mutual contact so that the surface of one port member acts as a valve for the ports of the other port member and the need for an intervening stationary valve plate, as previously used, is obviated. To give the ports overlapping but different rotational paths, to obtain the required valve action, the pump and motor axes are offset.

The present invention is, in some respects, a development from the above-mentioned transmission and likewise obviates the need for a stationary valve plate. The present invention also effects further improvements, enabling the pump and motor to be coaxial, thus simplifying design and balancing of thrust loads, and facilitating smoothly progressive change in the effective area of port opening requisite for smooth and quiet operation.

The invention is applied to a hydraulic, pump and motor combination, rotary power transmission apparatus, comprising coaxial pump and motor bodies having opposed ports for pump to motor exchange of liquid under pressure through one, thrust, sector of a common rotational path and for motor to pump return of liquid through another, return, sector of the common rotational path and, according to the invention, a freely rotatable valve ring is interposed between the pump and motor ports, in sealing surface contact with the pump and motor bodies, the valve ring having therethrough two separate passages, one passage constantly overlapping the path of the opposed ports in the thrust sector and the other passage constantly overlapping the path of the opposed ports in the return sector.

For constructional reasons, a passage through the valve ring may be sub-divided or be provided by interconnected passages, such as by separate bores or slots which open at each end into a channel in common.

In the case of pump and motor bodies having axially opposed ports with a coaxial rotational path in common, the separation of the thrust and return passages through an axially interposed valve ring can be achieved by off-setting the axis of the valve ring so that two arcuate passages therethrough, of different mean radii, respectively overlap the path of the ports through two opposite sectors. One of the arcuate passages may be a regular annulus whilst the other may be of crescent shape, formed by the eye of the valve ring being eccentric about a shaft.

The valve ring passages have their full flow capacity constantly available for the transfer of liquid and consequently the effective opening of the ports is controlled only by obturation of the ports themselves by the valve ring faces and does not depend on variable coincidence of the ports with a succession of valve ring passages. The valve action at the ports is thus smoothly progressive from opening through maximum, to closing as the ports enter, pass through and leave the sectors in which they overlap the respective passages of the valve ring.

The valve ring of the present invention therefore provides as smooth valve control of the ports as can be obtained with a stationary valve plate but with the advantage that frictional losses are substantially reduced because the valve ring can rotate with the pump and motor bodies and, apart from that due to its slight eccentricity, has a total relative movement, and hence a frictional loss, which is equivalent only to that, if any, between the pump and motor bodies. Further, in unidirectional transmission, the frictional drag is in a direction to augment power transmission.

In order to ensure sealing surface contact between the axially opposed faces of pump and motor bodies and an axially interposed valve ring, the valve ring may be composed of axially interfitting rings resiliently loaded apart so as to press axially and seal against the opposed faces of the pump and motor bodies.

The invention will now be further described with reference to the accompanying drawings, in which:

FIG. 1 is a diagrammatic axial section of the central part of a radial piston and cylinder, pump and motor combination.

FIG. 2 is a cross-sectional diagram across the centre of FIG. 1.

FIG. 4 is a cross-section of which the left-hand side is taken on the line A—A of FIG. 3, to show the pump, and the right-hand side is taken on the line B—B of FIG. 3, to show the motor.

FIG. 5 is a cross-section, on a larger scale, of the valve ring of the transmission of FIGS. 3 and 4.

Figure 3:
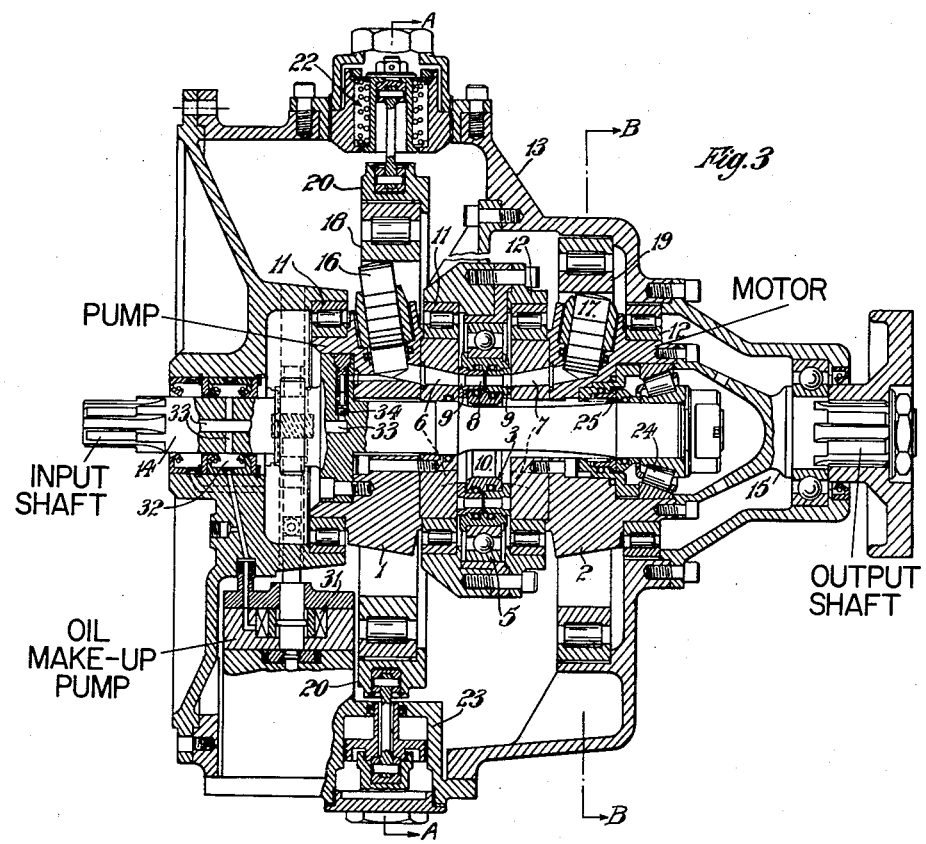
FIG. 3 is an axial section of a hydraulic variable speed transmission embodying the invention.

In the diagrams, FIGS. 1 and 2, 1 is the pump, 2 is the motor, 3 is the valve ring, 4 is a shaft, on which the pump and motor rotate about the axis x—x, and 5 is a ball bearing in which the valve ring 3 is free to rotate about the axis y—y.

The pump and motor have axially opposed rings of similar ports, 6 and 7 respectively, and the valve ring 3 has a thrust transfer passage provided by a ring of four quadrantal slots 8 opening at each end into an annular channel 9 in each face of the ring. Whatever the relative angular position or rotation of the valve ring, the ports 6 and 7 passing through the thrust sector T (see FIG. 2) intercommunicate through the channels 9 and slots 8 as through a constant passage. The horizontal hatching of the ports in the upper part of FIG. 2 shows their effective opening through the thrust sector T.

The return passage of the valve ring 3 is provided by the eye 10 of the ring being of suitably larger diameter than the shaft 4 so as to define therewith a crescent-shaped passage constantly open throughout the return sector R. The vertical hatching of the ports in the lower part of FIG. 2 shows their effective opening through the return sector R.

A constructional embodiment of the invention is shown in FIGS. 3 and 4 as applied to a hydraulic variable speed transmission.

In this transmission, the pump cylinder block 1 and motor cylinder block 2 are rotatably mounted, by roller bearings 11 and 12 respectively, coaxially in a closed casing 13 with an input shaft 14 and an output shaft 15.

The pump pistons 16 and the motor pistons 17 are slightly inclined and have spherical outer ends by which they bear against a surrounding reaction ring, 18 for the pump and 19 for the motor, provided by the inner race of a roller bearing in each case. The inclination and spherical ends of the pistons achieve piston rotation with rolling contact on the reaction rings and this reduces wear and improves efficiency.

The pump reaction ring 18 is carried by its outer bearing race in a frame 20 slidable vertically in guides 21 in the casing 13 and suspended between a double-acting spring assembly 22 at the top and a piston in a hydraulic control cylinder 23 at the bottom. In the neutral position of the frame 20, the ring 18 is concentric with the axis of the pump cylinder block 1 and rotation of the block by the input shaft 14 does not produce any reciprocation of the pump pistons 16. By means of the hydraulic control 23, the ring 18 can be positioned eccentrically, to a desired extent, to cause reciprocation of the pistons 16 with a stroke dependent on the adjusted eccentricity of the ring 18. This type of control by variable eccentricity of a reaction ring is well known in such hydraulic transmissions.

The motor reaction ring 19 is mounted by its outer bearing race in the casing 13 so that it has a constant eccentricity to the axis of the motor cylinder block 2.

The pump and motor cylinders form a closed circuit through their ports 6 and 7 and the transfer passages (8, 9) and 10 of a valve ring, indicated generally as 3, freely rotatably mounted, in the ball bearing 5, between the pump and motor cylinder blocks. The circuit is filled with oil.

The general principle of operation of a radial piston and reaction ring transmission of this kind is well known and need be only very briefly described.

On rotation of the pump cylinder block 1 by the input shaft 14, the pump pistons 16 bear outwardly, under centrifugal force, against their reaction ring 18 but, this being eccentric for normal drive, the pistons are successively thrust into their cylinders and displace oil under pressure through their ports 6, valve ring passage (8, 9) and motor ports 7. This oil under pressure thrusts the motor pistons 17 outwardly against the eccentric ring 19 and the reaction of their outward thrust has an angular component which produces rotation of the motor cylinder block 2 allowing outward movement of the motor pistons while under thrust from the pump. Rotation of the motor cylinder block, by reaction with the ring 19, thrusts inwardly the pistons which are not under pump pressure, to return oil through the ports 7, return transfer passage 10 and ports 6 to the pump cylinders on the intake strokes of the pump pistons.

By variation of the eccentricity of the pump reaction ring 18, by the hydraulic control 23, the pump piston stroke and thus output is controlled. The motor reaction ring 19 being of constant eccentricity, the motor is of constant stroke and capacity and thus variation of pump output produces a proportional variation of speed ratio. By diametral change of the direction of eccentricity of the pump reaction ring 18, the direction of rotation transmitted to the motor can be reversed, the valve ring passage (8, 9) then serving as the return passage and the eye passage 10 as the thrust passage.

Figure 6:
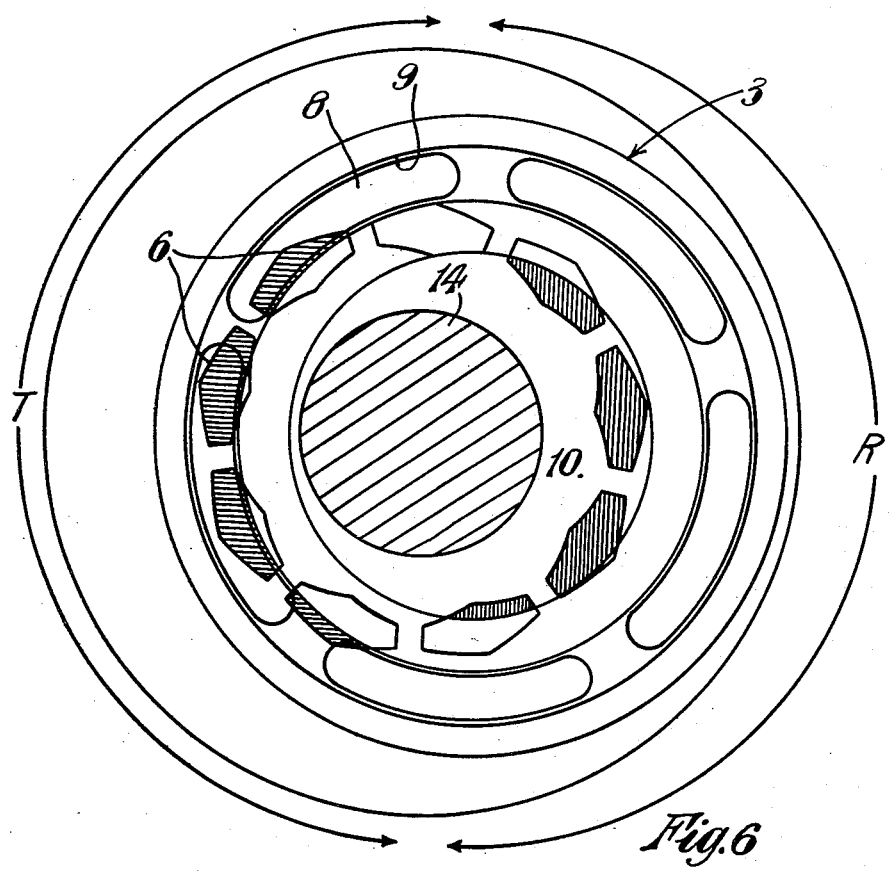
FIG. 6 is a cross-sectional diagram, similar to FIG. 2, to show the arrangement of the valve ring of the transmission of FIGS. 3 and 4.

As explained with reference to FIGS. 1 and 2, the axis y—y of the valve ring 3 is offset from the pump and motor axis x—x. In the transmission of FIGS. 3 and 4, this offsetting is horizontal so that the thrust and return sectors are divided vertically, as indicated in FIG. 6, instead of horizontally, as in FIG. 2. However, for the purpose of illustration, the valve ring 3 in FIG. 3 is shown 90° out of position.

It will be seen that the quadrantal slots 8 and annular channels 9 of the valve ring 3 provide a constant passage into which the ports 6 and 7 open during one sector of rotation. Also, the eye of the valve ring 3 provides, around an extension of the shaft 14, a crescent-shaped constant passage 10 into which the ports 6 and 7 open during the opposite sector of their rotation.

The ports 6 and 7 are profiled as shown so that there is a positive cut-off as they pass between the two sectors. Also, the ports open into the valve ring passages at least proportionally to piston displacement so that there is no throttling of oil at the ports.

The opposed faces of the cylinder blocks and valve ring are well lubricated, by the oil of the hydraulic circuit, and are thrust axially together by a thrust bearing 24 on the tail end of the extension of the input shaft 14. When the transmission is run in reverse, the eye passage 10 of the valve ring 3 is under pump pressure and, to prevent resultant leakage past the thrust bearing 24, a face seal 25 is provided.

In order to ensure efficient sealing between the faces of the cylinder blocks and valve ring, it is preferred to make up the valve ring by axially interfitting rings which are resiliently loaded apart so as to press axially and seal against the ported faces of the cylinder blocks.

As shown by FIG. 5, the valve ring 3 is composed of four rings; an outer, carrier, ring 26, a pair of end sealing rings, 27 and 28, and an inner sealing ring 29. The outer and inner rings 26 and 29 have circumferential channels in which are provided rolling rubber ring seals 30, so-called O-rings, to prevent leakage of oil from or to the passages (8, 9), provided in the end rings 27 and 28, and 10, provided by the eye of the inner ring 29.

The end sealing rings 27 and 28 are loaded axially apart, to seal against their respective cylinder block faces, by the effect of oil under pressure on the axially opposed faces of the end rings and inner ring 29. This pressure is effective at F, when the transmission is running forward and the passage (8, 9) is under thrust pressure, or at G, when the transmission is in reverse and the passage 10 is under thrust pressure.

The rings 27, 28 and 29 are made asymmetrical, as regards the relative area of their axially opposed faces, so that the inner ring 29 has a positive bias one way or the other under the effect of oil pressure. When the pressure is at F the inner ring 29 is thrust to the left, as seen in FIG. 5, with the end ring 27 whereas when the pressure is at G the inner ring is thrust to the right against the end ring 28. In either event, the end rings are positively urged apart to seal against their respective cylinder block faces.

Some loss of oil from the pump and motor circuit is inevitable and, to make up for leakage, oil from the sump of the casing 13 is pumped, by an auxiliary pump 31 driven from the shaft 14, to a sealed annular chamber 32 around the shaft 14 and from which passages 33 in the shaft 14 lead the oil to an angularly spaced series of spring-loaded replenishment valves 34 which open to admit oil to the pump cylinders on suction whenever the pressure falls below the spring pressure value set on the valves 34.

I claim:

1. A hydraulic rotary power transmission apparatus comprising a casing, a rotary pump body journalled in said casing and having ports for inlet and outlet of hydraulic fluid, displacement means in said pump body for displacing hydraulic fluid through said ports on rotation of said pump body, reaction means for operating said displacement means, a rotary motor body journalled in said casing and having ports for inlet and outlet of hydraulic fluid, means in said motor body displaceable by hydraulic fluid passing through said ports, reaction means to cooperate with said displaceable means whereby said motor body is rotated, said pump and motor bodies being coaxial, a freely rotatable valve means positioned between and in sealing-surface contact with said pump and motor bodies and having an axis of rotation offset from the axis of said bodies, said valve means having therethrough two separate passageways for hydraulic fluid, one of said passageways constantly overlapping some of said ports and the other of said passageways constantly overlapping other of said ports.

2. A hydraulic apparatus according to claim 1, wherein said valve means is a valve ring journalled in said casing, one of said passageways being formed by the eye of said valve ring and the other of said passageways having the form of an annulus and consisting of axial slots which open at each end into a channel in common in each face of said valve ring.

3. A hydraulic rotary power transmission comprising a casing, a rotary pump body having cylinders therein journalled in said casing, an input shaft connected to said pump body, piston means positioned in said cylinders, a reaction member positioned around said pump body and cooperating with said pistons, said reaction member being movably attached to said casing, means operatively connected to said reaction member for moving said member whereby the stroke of said pistons is varied, a rotary motor body journalled in said casing and having cylinders therein, an output shaft connected to said motor body, piston means positioned in said motor cylinders, a second reaction member positioned around said motor body and cooperating with said motor pistons, said second reaction member being fixed to said casing, said pump and motor bodies being coaxially aligned, a freely rotatable valve means positioned between and in sealing surface contact with said pump and motor bodies and having an axis of rotation offset from the axis of said bodies, said valve means being journalled in said casing, said valve means having fluid passageways therethrough, said passageways constantly overlapping inlet and outlet ports of the pump and motor bodies.

4. A hydraulic apparatus according to claim 3, wherein said valve means is a valve ring journalled in said casing, one of said passageways being formed by the eye of said valve ring and the other of said passageways having the form of an annulus and consisting of axial slots which open at each end into a channel in common in each face of said valve ring.

5. In a hydraulic rotary power transmission apparatus including coaxially opposed rotary pump and motor bodies having opposed inlet and outlet ports and valve means rotatable about an axis offset from the axes of and positioned between opposed axial faces of said pump and motor bodies, said valve means having therethrough two separate passageways for hydraulic fluid, one of said passageways constantly overlapping some of said ports and the other of said passageways constantly overlapping other of said ports, said pump and motor bodies being individually rotatably mounted so that relative rotation can take place between them, said valve means comprising a valve ring freely rotatably journaled about said offset axis as a single rotary unit and opposite axial faces of said valve ring being in direct sealing surface contact respectively with said opposed axial faces of said pump and motor bodies.

References Cited in the file of this patent

UNITED STATES PATENTS

| | | |
|---|---|---|
| 1,682,303 | Mohl | Aug. 28, 1928 |
| 1,910,054 | Rayburn | May 23, 1933 |
| 1,914,622 | Smith | June 20, 1933 |
| 2,176,401 | Johns | Oct. 17, 1939 |
| 2,227,631 | Carter | Jan. 7, 1941 |
| 2,788,636 | Badalini | Apr. 16, 1957 |
| 2,803,112 | Sadler | Aug. 20, 1957 |
| 2,812,638 | Timms | Nov. 12, 1957 |